US006032235A

United States Patent [19]

Hoge

[11] Patent Number: 6,032,235

[45] Date of Patent: Feb. 29, 2000

[54] MEMORY INITIALIZATION CIRCUIT

[75] Inventor: Stephen Hoge, Santa Cruz, Calif.

[73] Assignee: Creative Technology Ltd., Singapore

[21] Appl. No.: 08/970,667

[22] Filed: Nov. 14, 1997

[51] Int. Cl.[7] .................................................. G06F 12/00

[52] U.S. Cl. ........................................ 711/156; 711/166

[58] Field of Search .................................. 711/156, 166

[56] References Cited

U.S. PATENT DOCUMENTS

| | | | |
|---|---|---|---|
| 4,472,993 | 9/1984 | Futamase et al. | 84/1.24 |
| 5,111,727 | 5/1992 | Rossum | 84/603 |
| 5,342,990 | 8/1994 | Rossum | 84/603 |
| 5,376,752 | 12/1994 | Limberis et al. | 84/622 |
| 5,657,476 | 8/1997 | O'Connell et al. | 711/166 |

OTHER PUBLICATIONS

Peter N. Glaskowsky, "Crystal SLIMD Speeds PCI Audio," *Microdesign Resources—Microprocessor Report*, pp. 13–15, Mar. 1997.

Alex Limberis et al., "Real–time Controllers for Exceptionally Expressive Performance," *Audio Engineering Society, 95th Convention in New York—Oct. 7–10, 1993*, pp. 1–4, Oct. 1993.

*Primary Examiner*—Reginald G. Bragdon

*Attorney, Agent, or Firm*—Townsend & Townsend and Crew LLP

[57] ABSTRACT

A memory initialization circuit for preventing random garbage data left over from a previous program from being read into a newly executed program. The initialization circuit is applicable to memories of all types, but is particularly useful for memories used to implement audio effects through the use of audio delay lines and audio tables. The memory initialization circuit includes multiple dual-use memory buffers, each of which store data for either a value representative of an audio delay length or an audio data signal. Multiple memory use indicators (e.g., flags) corresponding to the dual-use memory buffers indicate whether the data stored in each buffer represents an audio delay length or an audio data signal. The circuit also includes a counter that sequentially updates a count value and compare logic, which is coupled to the dual-use memory buffers and to the counter. The compare logic updates a given memory use indicator based on a comparison of the data stored in the memory buffer corresponding to the given memory use indicator and the value of the counter. When the counter reaches a stored audio delay length value, the memory use indicator is reset to a state that indicates valid TRAM data can be loaded into the memory buffer location. The circuit requires only one counter for the entire array of memory buffer locations.

24 Claims, 6 Drawing Sheets

MEMORY INITIALIZATION CIRCUIT

BACKGROUND OF THE INVENTION

The present invention relates to a memory initialization circuit. More specifically, the present invention relates to a circuit and method for initializing memory locations within an audio data memory that is accessed by an audio effects processor to implement audio sound effects.

Sound effects audio signal processors (ASPs) are commonly used to generate sound effects in a multitude of audio components, some examples being programmable musical instruments, video games, cinema sound systems, virtual reality systems, and computer audio systems. Such sound effects include, but are not limited to, reverberation effects, 3-D audio, and distortion effects. ASPs create sound effects by executing programs containing a series of instructions. Each instruction directs the ASP to perform a specific logical and/or arithmetic operation on the received signal, resulting in the program's creation of a particular sound effect.

It is common for ASPs to implement sound effects through the use of audio data memories such as audio delay lines and audio tables, which often take the form of a large block of relatively slow "tank" RAM (TRAM) memory. Typically, known ASPs perform operations on the TRAM data in response to the execution of sound processing instructions by an instruction execution unit of the ASP. When a sound processor program is initially loaded into the ASP, the TRAM data must be initialized or cleared to prevent random garbage data left in the TRAM by a previous sound processor program from being read into the newly executed program.

One way of initializing or clearing the TRAM data is to write 0s to each memory location in the TRAM. This can be a time consuming task, however, that is often considered a less-than-optimal approach for a number of reasons. For one, no audio output will be generated from the effect (even non-delayed signals) until all the TRAM data is cleared. Also, the time required to zero all the TRAM memory locations is dependent on the TRAM bandwidth used for writing the zero values. In some systems this might be as slow as the longest delay in the system—on the order of seconds. Finally, besides being time-consuming, TRAM clearing complicates the structure of any program loader, which must first pause (or return to the application) for a significant amount of time while TRAM clearing is occurring, then complete the program load operation by initializing the effects's output levels to audible levels.

Another approach for initializing an audio data memory such as a TRAM is described in U.S. Pat. No. 5,376,752 issued Limberis et al. In the Limberis et al. patent, an audio data memory is initialized by a hardware circuit that returns zeros from every delay line read operation until the data in each delay line is guaranteed to be valid. Thus, in effect, the memory is not actually cleared at all. The delay line data is guaranteed to be valid by associating with each delay line read address a counter register that increments once each time a write operation is performed to that delay line. While the write counter value is less than the read address, a hardware circuit returns zeros from any TRAM read operation. After the write counter has equaled the delay offset, however, all data in the delay line is guaranteed to be the result of a valid write operation, and this initialized data is returned from all subsequent read operations.

The approach described in the Limberis et al. patent requires a buffer and associated counter for each delay line implemented in the audio data memory. The circuit disclosed in the patent allows for the implementation of 64 such delay lines, and thus requires 64 separate counters and buffers. Accordingly, this approach is also a less-than-optimal solution to the sound memory initialization requirement and new methods and circuits for initializing audio data memories are desirable.

SUMMARY OF THE INVENTION

The present invention provides an improved circuit for the initialization of a memory such as an audio data memory. The initialization circuit includes multiple dual-use memory buffers, each of which store data for either a value representative of an audio delay length or an audio data signal. Multiple memory use indicators (e.g., flags) corresponding to the dual-use memory buffers indicate whether the data stored in each buffer represents an audio delay length or an audio data signal. The circuit also includes a counter that sequentially updates a count value and compare logic, which is coupled to the dual-use memory buffers and to the counter. The compare logic updates a given memory use indicator based on a comparison of the data stored in the memory buffer corresponding to the given memory use indicator and the value of the counter. When the counter reaches a stored audio delay length value, the memory use indicator is reset to a state that indicates valid TRAM data can be loaded into the memory buffer location. The circuit requires only one counter for the entire array of memory buffer locations.

For a further description of the nature and advantages of the present invention, reference should be made to the following description taken in conjunction with the accompanying drawings.

DETAILED DESCRIPTION OF THE PREFERRED EMBODIMENTS

Figure 1A:
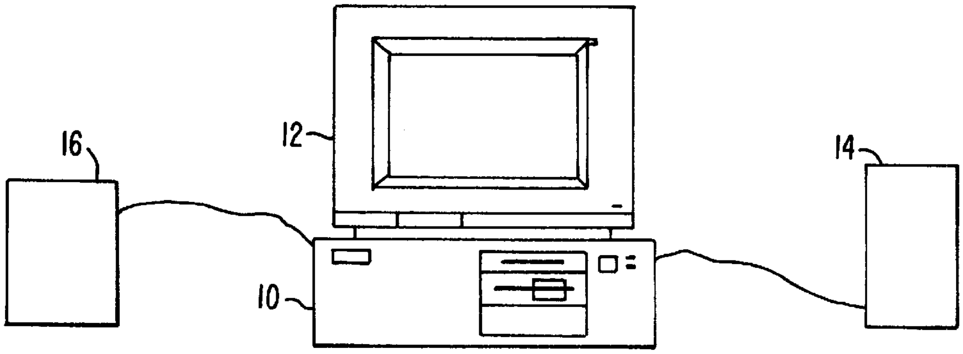
FIG. 1A depicts a representative multimedia personal computer system in which the audio effects processor of the present invention may be employed.

The present invention is applicable to memories of all kinds that require initialization to a particular value and is particularly applicable to audio data memories used in conjunction with digital sound generation systems of all kinds. Advanced audio effects can be provided to video games, multimedia computer systems, virtual reality environments, cinema sound systems, home theater, and home digital audio systems, for example. FIG. 1A depicts a representative multimedia personal computer 10 with a monitor 12 and left and right speakers 14 and 16, an exemplary system that can include a sound processor having an audio data memory that can be initialized in accordance with the apparatus and method of the present invention.

Figure 1B:
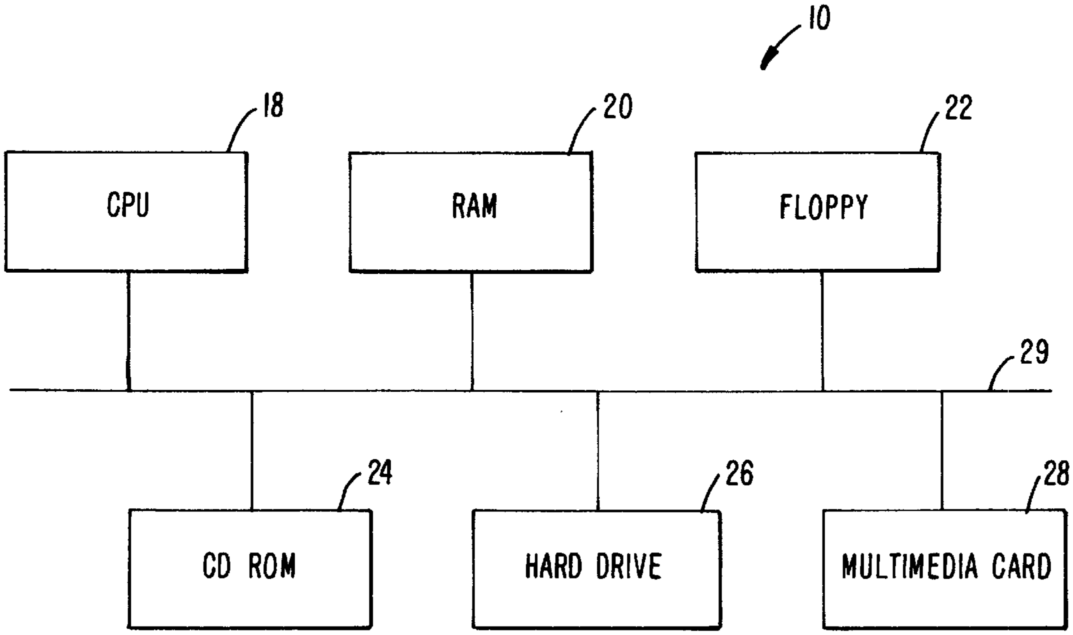
FIG. 1B depicts a simplified representation of the internal architecture of the multimedia personal computer system depicted in FIG. 1A.

FIG. 1B depicts a greatly simplified representation of the internal architecture of personal computer 10. Personal computer 10 includes a CPU 18, a memory 20, a floppy drive 22, a CD-ROM drive 24, a hard drive 26, and a multimedia card 28. Each of the components of computer 10 shown in FIG. 1B communicate with each other over a bus system 29. Of course, many possible computer configurations could be used with the invention. In fact, the present invention is not limited to the context of personal computers and finds application in video games, cinema sound systems and many other systems.

Figure 2:
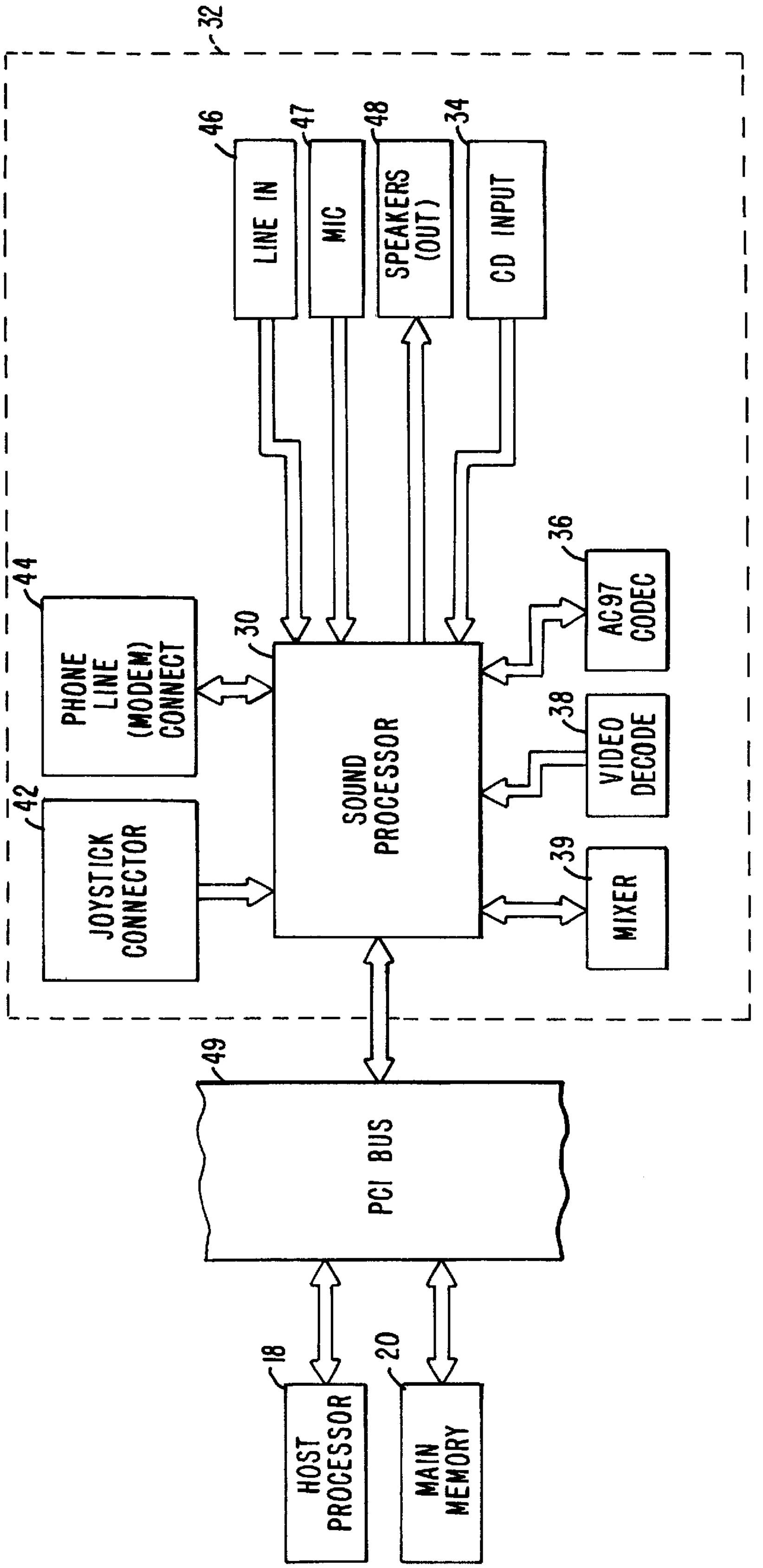
FIG. 2 is a simplified block diagram of multimedia board 28 shown in FIG. 1B, a board onto which the audio signal processor of the present invention could be incorporated.

FIG. 2 illustrates a typical multimedia card 28 on which an integrated circuit including the memory initialization circuit of the present invention may be mounted. Multimedia card 28 includes a sound processor chip 30 mounted on a circuit board 32. As shown in FIG. 2, a CDROM connector 34, an AC97 CODEC 36, an optional AC3 decompressor/decoder 38 and a mixer 39 are all connected to sound processor chip 30 through appropriate interfaces.

Also shown in FIG. 2 are various other connections to sound processor 30, including a joystick connector 42, a phone line connection 44 for a modem (not shown), a line-in connector 46, a microphone connector 47, and a speaker output 48. In addition, a connection to a PCI bus 49, which is part of bus system 29, is shown. Bus 49 connects to the host microprocessor 18 and to main memory 20.

Figure 3:
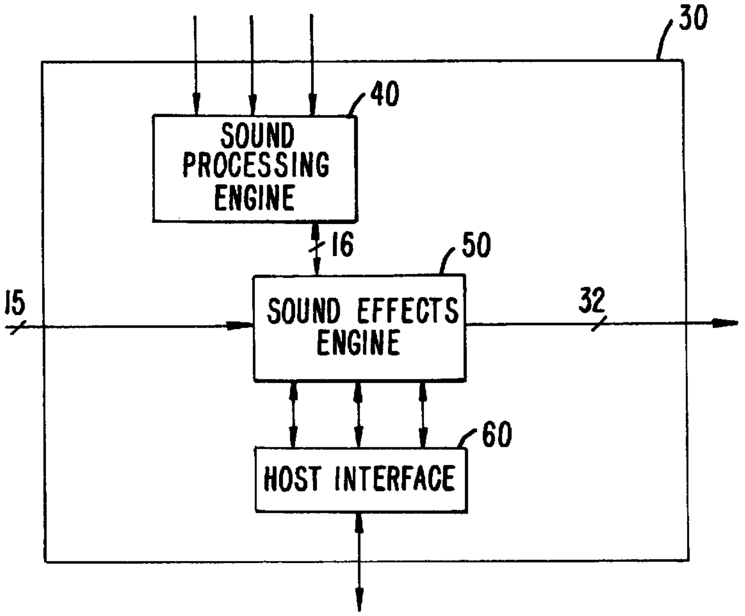
FIG. 3 is a simplified block diagram of one embodiment of the audio signal processor shown in FIG. 2.

In a preferred embodiment, the memory initialization of the present invention is included in an integrated circuit such as a sound processor chip 30. A simplified block diagram of an exemplary sound processor 30 is shown in FIG. 3. It is to be understood that many of the details of sound processor 30 are for exemplary purposes only and are not intended to limit the scope of the present invention in any manner.

Exemplary sound processor 30 includes three primary functional units: a sound processing engine 40, a sound effects engine 50 and a host interface unit 60. Sound processing engine 40 is a 64-voice wavetable synthesizer that employs an eight-point interpolation algorithm for professional quality audio playback as described in U.S. Pat. No. 5,342,990 entitled "Digital Sampling Instrument Employing Cache Memory" and 16 summing effects send buses. Each of the 64 voice channels can be routed, at its own programmable amplitude, to an arbitrary selection of four of these buses. Host interface unit 60 interfaces sound processor 30 with host CPU 18 using the PCI protocol. Sound effects engine 50 receives input from sound processing engine 40 and from additional audio inputs such as CD Audio, ZVideo, a microphone jack, a stereo input and an auxiliary S/PDIF input among others. Further details of sound effects engine 50 and host interface unit 60 are described below with respect to FIG. 4. Other details of host interface unit 60 along with some details of sound processing engine 40 and other portions of sound processor 30 are set forth in U.S. Ser. No. 08/887,100 entitled "Audio Effects Processor with Multiple Asynchronous Audio Streams," having David P. Rossum and Scott Fuller as inventors and assigned to Creative Technologies, Ltd., the assignee of the present invention. The U.S. Pat. No. 5,342,990 patent and the Ser. No. 08/887,100 application are both hereby incorporated by reference in their entirety.

Figure 4:
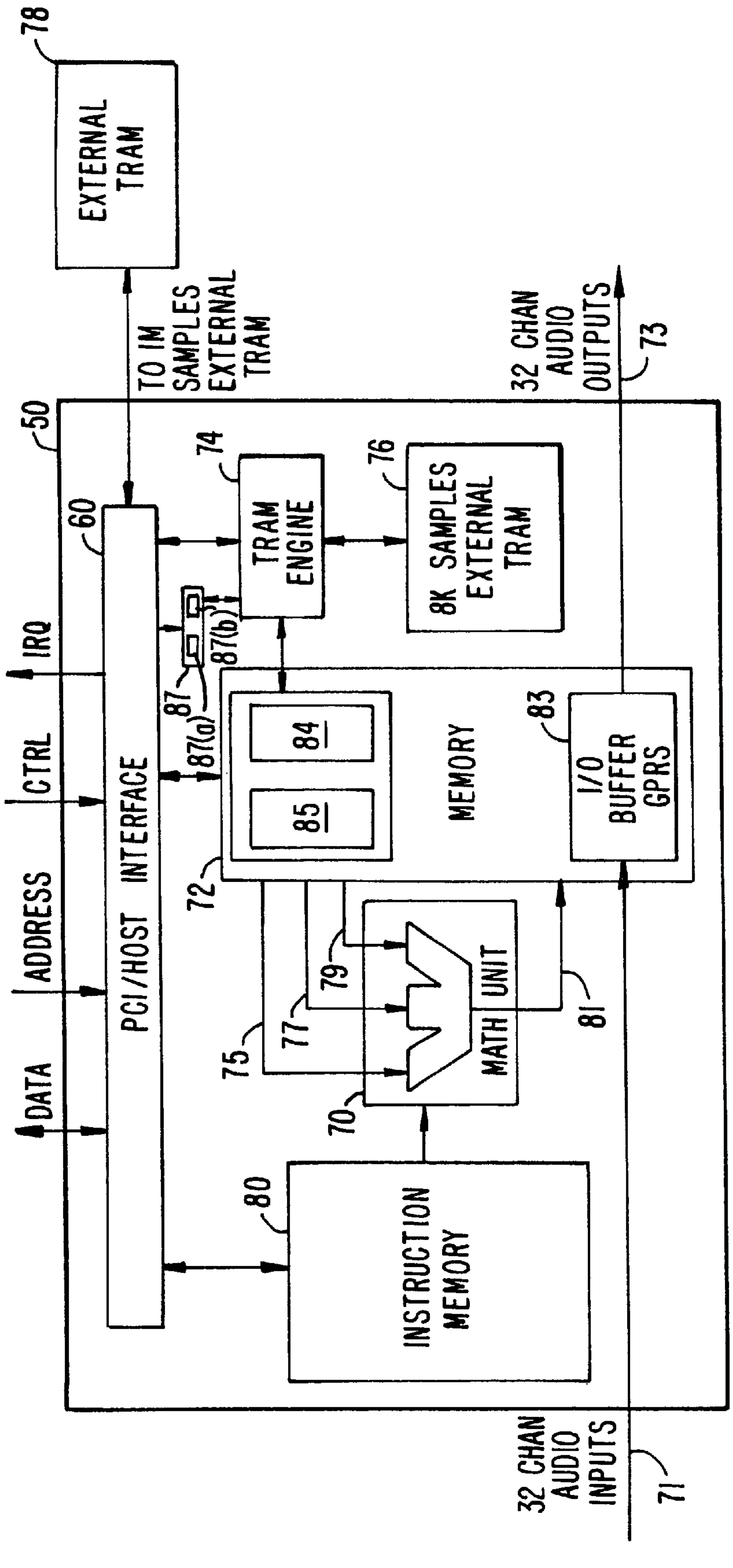
FIG. 4 is a simplified block diagram of audio effects processor 50 in accordance with the present invention shown in FIG. 3.

One particular implementation of a sound effects processor 50 is illustrated in FIG. 4 and discussed below. In no respect is the present invention limited to use with this specific implementation, however. After reading the following description, a person of ordinary skill in the art will understand that the memory initialization circuit of the present invention can be used with other implementations of sound effects processor 50 without departing from the concept of the present invention.

Sound effects engine 50 (also referred to as "effects processor 50") includes separate functional units to 1) execute audio signal processing instructions and 2) implement audio data storage (e.g., audio signal delay lines and table look-ups). These functional units operate independent of each other and exchange data through a shared memory address space. As shown in FIG. 4, the basic architecture of this embodiment of effects processor 50 combines an instruction execution unit 70, a high-speed internal memory 72 and a sound memory engine 74 (also referred to as "TRAM engine 74"), which interfaces to internal and external slower-speed, high capacity TRAM memories 76 and 78. Audio signals are received by effects processor 50 at a processor input 71, where they are directed to a dual buffered portion 83 of memory 72. In this embodiment, the audio signals received at input 71 include 16 voices output from sound processing engine 40, 2 lines for a stereo input, 2 lines for a CD audio input, 2 lines for a zvideo input, a microphone input, 2 lines for an auxiliary S/PDIF input and a 6-line $I^2S$ input.

Instruction execution unit 70 executes instructions stored in an internal microprogram memory 80, separate from memory 72 to perform particular operations on one or more of the audio signals stored in memory address space 83. Further details of instruction execution along with specifics of the instruction set executed by instruction execution unit 70 are set forth in U.S. Ser. No. 08/887,362 entitled, "Audio Effects Processor Having Decoupled Instruction Execution and Audio Data Sequencing," having Stephen Hoge as the inventor and in U.S. Ser. No. 08/886,920, now U.S. Pat. No. 5,930,158, entitled, "Processor With Instruction Set for Audio Effects," having Stephen Hoge as the inventor. The Ser. No. 08/887,362 application and Ser. No. 08/886,920 application are both assigned to Creative Technology, Ltd., the assignee of the present invention and are both hereby incorporated by reference for all purposes.

Also shown in FIG. 4 is host interface unit 60, which allows the host processor (CPU 18) to control the operation of audio effects processor 50. Such control is achieved by allowing the host to initialize and read and write data and executable instructions to memory 72 and/or microprogram memory 80. Such memory read and write operations can be executed transparent to the execution of digital signal processing (DSP) programs allowing audio effects processor 50 to support simultaneous startup, execution and shutdown of multiple independent and separately loaded programs. In this embodiment, communication between the host processor and audio effects processor 50 through interface unit 60 occurs over a PCI bus using a PCI protocol, but other protocols can be implemented in other embodiments.

As previously mentioned, sound effects processor 50 also includes a sound memory engine 74. Sound memory engine 74 is the interface between memory 72 and the large capacity TRAM memory 78 used for long-term audio data storage. Sound memory engine 74 has access, shared with the instruction execution unit and the host interface, to blocks of RAM mapped into the address space of memory 72 which implement the TRAM address buffer and TRAM data buffer. These twin buffer memories (TRAM data buffer 84 and TRAM address buffer 85) hold data and address pairs which along with a memory use indicator 87 (also referred to as "control bits 87"), including a memory clearing indicator 87*a* (also referred to as "clearing flag 87*a*") and mode operation indicator 87*b* (also referred to as "read/write bits 87*b*"), completely specify the activity of the TRAM engine during a sample period. Buffers 84 and 85 represent the "program" executed by the TRAM engine every sample period. Whenever a program compiled for sound effects engine 50 reads or writes to a delay line, it is actually locations in TRAM data buffer 84 that are used as the operands. Ordinarily, address offsets stored in TRAM address buffer 85 are constants initialized by the host processor, but any instruction executed by instruction execution unit 70 can compute a new delay line address by storing its results in the appropriate TRAM address buffer of memory 72.

During each sample period, the TRAM engine runs sequentially through each of the buffers' address/data pairs, so that the buffer contents represent an ordered list of TRAM accesses throughout the entire sample period. During every TRAM memory cycle within the sample period, a TRAM address offset is fetched by the sound memory engine from the TRAM address buffer GPRs, an absolute TRAM memory address is computed from the offset, and a signal value is either fetched from or written to the address paired TRAM data buffer location.

The TRAM data buffers are the source and sink for audio data flowing from the TRAM, and each data buffer location is paired one-to-one with an address buffer location; the address buffer holds the address in the TRAM that corresponds to the data. Control bits 87 are a separate array (writable from the host and not mapped into memory space 72) having a field associated with each data/address pair. Certain of these control bits (control bits 87(*b*)—a two-bit field in this embodiment) specify what type of TRAM operation, e.g., read or write, should take place using the corresponding data and address pair. Further details of how sound memory engine 74 interfaces to the TRAM memory to implement audio delay lines and table-based addressing are set forth in the Ser. No. 08/887,362 application discussed above and previously incorporated by reference.

Initialization of TRAM Data and Address Buffers 84 and 85

TRAM read and write operations start as soon as power is received by effects processor 50. Standard write operations do not pose a problem, but unless TRAMs 76 and 78 are properly initialized, read operations will initially produce unpredictable data that result from the power-up state of the TRAM or from previous operations on the TRAM. Thus, it is important to initialize the TRAMs.

The present invention provides an initialization circuit 90 that is included in TRAM engine 74 to initialize the TRAMs by returning zeroes from any scheduled delay line read operation until it is guaranteed that the delay line contains valid data. Initialization circuit 90, shown in FIG. 5 as a portion of TRAM engine 74, counts down at least the number of sample periods in the delay line's length before returning valid data, and thus must keep track of the delay length at each point on the delay line where a read operation occurs (note that the read address stored in the TRAM Address buffer is not the same as this delay length, which is the difference between the delay line's write and read addresses). For the countdown period before valid data is returned from a delay line read operation, the TRAM data buffer location in buffer 84 corresponding to the read operation is essentially unused, since there is no need to store a zero there. Thus, TRAM data buffer 84 provides a location where the delay length countdown value can temporarily be stored instead of the delay line read data and for this reason can be referred to as a dual-use memory buffer.

Initialization circuit 90 uses a single zeroed samples counter 92 which begins counting upwards from zero at the sample rate when a sound processor program first starts. As the counter increments each sample period, it is compared by a comparator 94 against every countdown length temporarily stored in TRAM data buffer 84 [i.e., the countdown length stored in each of the buffer locations 84(1). . . 84(*n*)]. As the counter increments, the count must eventually become equal to the compared countdown length in each individual buffer location. Until an equality match occurs between the counter and a countdown length, a zero is returned from a read multiplexor 98 each time the sound processor program reads that TRAM data buffer location [e.g., a location 84(*i*)].

When a match between an individual buffer location 84(*i*) within TRAM buffer 84 occurs, however, an appropriate amount of time has passed for data in the delay line to have become valid. Thus, valid data can be returned at this point. One sample period following a match between the value of counter 92 and the delay length stored in buffer location 84(*i*), the TRAM data buffer location 84(*i*) is filled with incoming TRAM data, and the delay length temporarily stored there is overwritten. At this point, the dual-use memory buffer reverts from its function as a temporary countdown storage to its function as an incoming TRAM data buffer.

Figure 6:
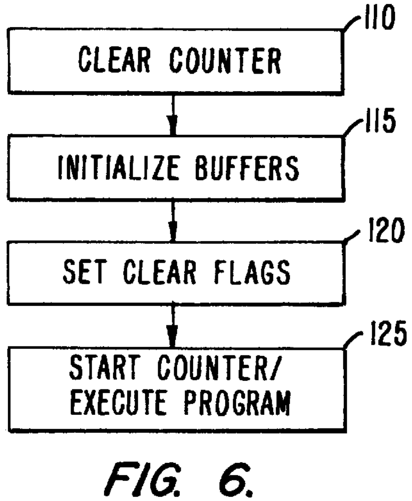
FIG. 6 is a flow chart indicating the sequence of operations for memory initialization when a second processor program is loaded into sound processor 50.

When a sound processor program is first loaded, the host processor forces zeroed samples counter 92 to zero by a start-zeroing signal on line 93 (FIG. 6, step 110). Next, delay lengths are written into each location in TRAM data buffer 84 that corresponds to a read operation (these lengths can be determined at program compile time) (step 115) and clearing flags 87*a* are set to the CLR state (step 120). After the buffer values and clearing flags have been set, the count of counter 92 is started and program execution is enabled (step 125).

While the program is executing, all entries in the TRAM buffers [locations 84(1). . . 84(*n*)] are run through sequentially each sample period by TRAM engine 74. At entries where TRAM read operations are to occur and the CLR state of the corresponding flag 87*a* is set, no data from the TRAM is written into the TRAM data buffer. Instead, the buffer is read and the countdown value (the delay length) is compared against the current count of counter 92. If no match occurs, the CLR state of clearing flag 87*a* is preserved by a clear logic circuit 96. If a match does occur, however, the state of the corresponding flag 87*a* is changed by logic circuit 96 to RD to indicate that valid reads may take place. Also at this time the data buffer countdown length stored in the buffer entry is overwritten with the data returned from the delay line, since the delay line is guaranteed to be providing valid data.

During program execution, each instruction which reads from an individual TRAM data buffer [e.g., buffer location 84(*i*)] actually accesses read multiplexor 98 instead. Multiplexor 98 passes one of two inputs, selected by the state of the flags field 87$a(i)$ corresponding to the data buffer location 84($i$) being read. When the state of flag 87$a(i)$ is CLR, the multiplexor 92 selects all zeroes to output on the operand bus. When that state of flag 87$a(i)$ is RD, the actual value read from the TRAM data buffer 84($i$) is output. Thus, while a delay line is still being cleared, multiplexor 92 delivers a zero; once the delay line is guaranteed to have delivered valid data to the TRAM data buffer, clear flags set to RD for that buffer location allow the buffer data to be passed through.

Figure 5:
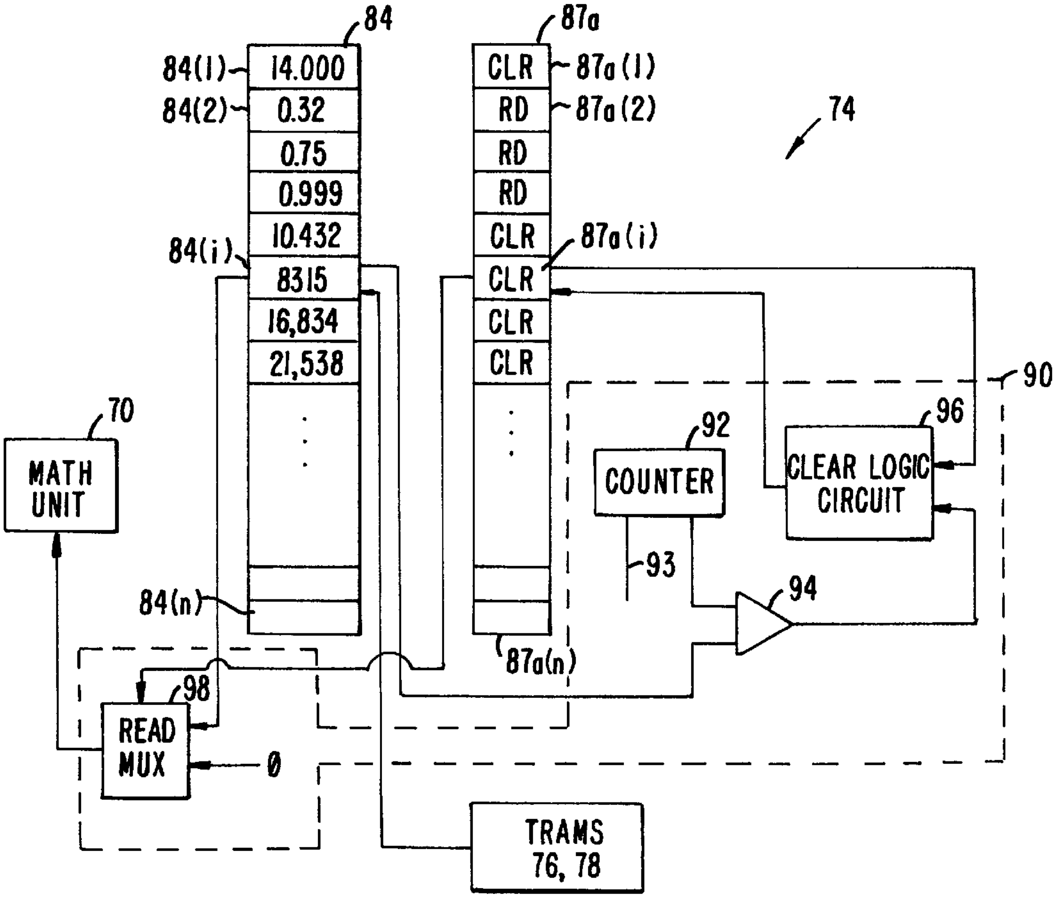
FIG. 5 is a block diagram of a portion sound memory engine 74 shown in FIG. 4 that includes one embodiment of the memory initialization circuit of the present invention.

As an example, the scheme shown in FIG. 5 includes both TRAM buffer locations that have been cleared and some locations that have not been cleared. TRAM data buffer locations shown in fractional values have already cleared and are returning valid data; their corresponding CLR fields are changed to RD (readable). TRAM data buffer locations with integer values have not yet been completely cleared, which in this example means that the count of counter 92 is less than 8315 (the value representative of the length associated with shortest remaining uncleared delay line).

In a preferred embodiment of sound processing engine 40, engine 40 has the ability to perform read, sum and write (RSAW) accesses to the TRAM. This feature is included specifically to support a substitute-add delay line methodology.

In the substitute-add technique, many delay lines of varying lengths whose outputs would otherwise be summed together can be implemented as a "single" delay line with summing occurring at many points within the delay-line body. At each summing point, a delay read, signal sum and delay write operation is performed. When implementing many summed delay lines, this substitute-add technique can provide a great savings in delay line memory, albeit at a somewhat increased cost in bandwidth.

Figure 7A:
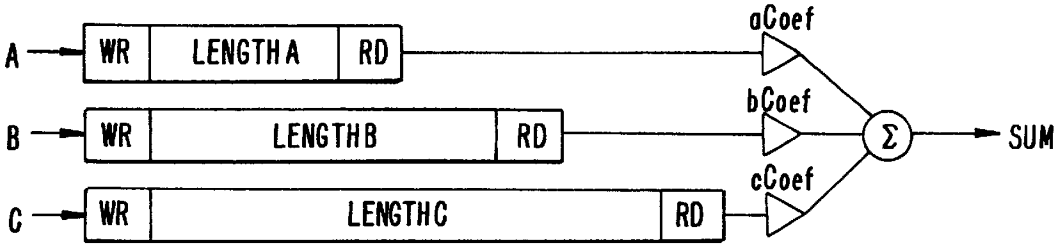
FIGS. 7A and 7B are diagrams that illustrate the concept of read, sum and write TRAM accesses performed by a preferred embodiment of TRAM engine 74.
Figure 7B:
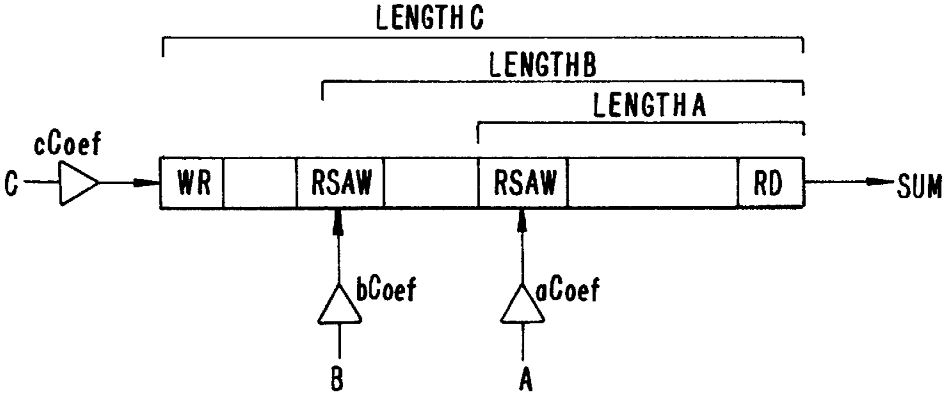

FIGS. 7A and 7B show two equivalent techniques for realizing three delay lines of lengths LengthA, LengthB and LengthC. FIG. 7A shows a a typical implementation that requires total delay memory of LengthA+LengthB+LengthC. FIG. 7B shows the equivalent signal flow implemented with RSAW operations; the total delay memory is only equal to LengthC, the longest of the three delay lines.

For this reason, a preferred embodiment of TRAM engine 74 includes the RSAW capability. The capability comes at a modest cost in hardware and at a bandwidth cost of a factor of 2—not a great impact on the high-bandwidth internal TRAM memory space. As a result, any access to internal TRAM 76 can be selected as either a read, write or RSAW operation. During an RSAW access, the TRAM address is fetched from address buffers 85, the data at that address is read from the TRAM and summed with the data in the corresponding data buffer 84, and the sum is written back to that same TRAM address. Ideally, TRAM clearing for RSAW operations would simply translate to write operations. Unfortunately, the buffer location which would hold the write data cannot also hold the countdown data.

Instead, a second embodiment of the initialization circuit of the present invention writes zeroes to TRAM memory as long as the CLR state of a corresponding clearing 87($i$) is active (i.e., while the countdown length and counter do not match). This second embodiment of initialization circuit 130 is shown in FIG. 8.

Figure 8:
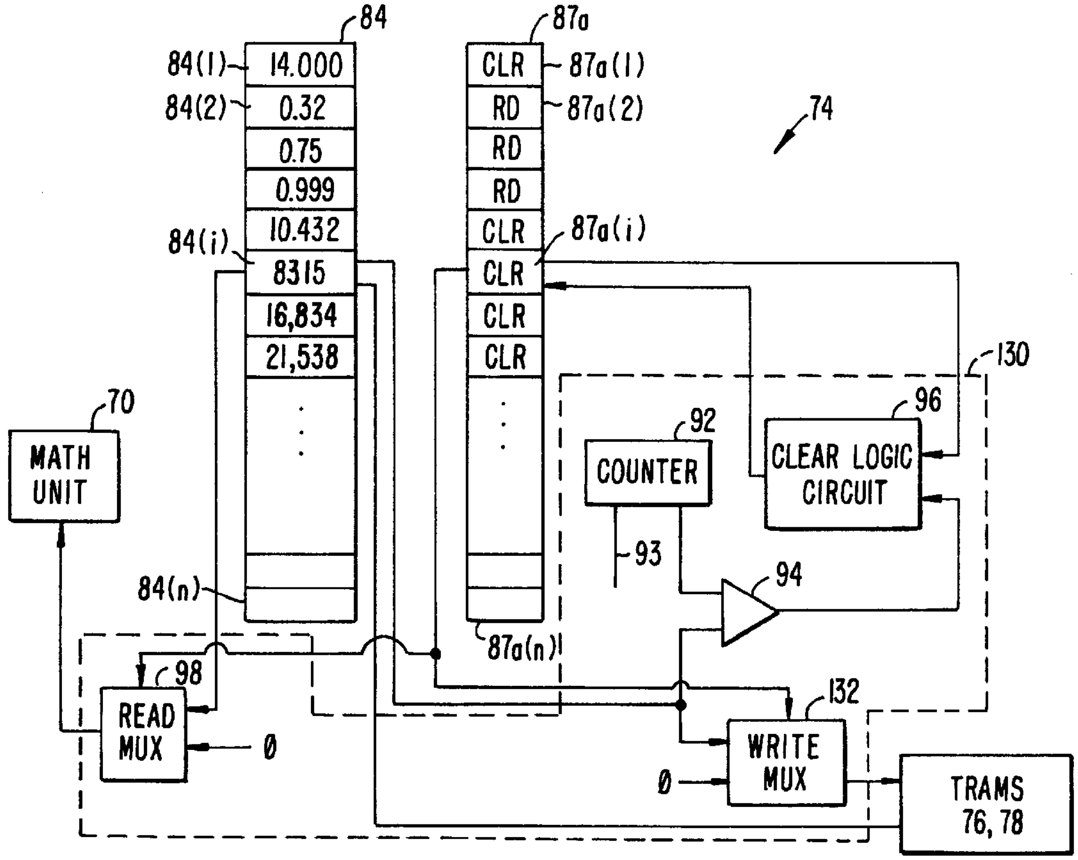
FIG. 8 is a block diagram of a second embodiment of the memory initialization circuit of the present invention.

As shown in FIG. 8, initialization circuit 130 includes all the functionality of initialization circuit 90 and also includes a write multiplexor 132. While the flag 87$a(i)$ is set to CLR and RSAW operations are enabled, no write operations are allowed into the TRAM data buffer 84($i$) by microinstructions. Also during this time, the clearing flag 87$a$ ($i$) causes the write multiplexor 132 to write zeroes to the TRAM instead of the contents of the data buffer which holds the countdown length.

For RSAW operations, the countdown length should be programmed to be the distance in samples from the RSAW operation to the next most recent write or RSAW operation on that delay line. The final read operation will have its countdown length equal to the distance from the most recent RSAW operation. This guarantees that zeroes will be written to the delay line in place of each potential read, sum and write that would have occurred using invalid data.

The above is a full, detailed description of one specific embodiment of the present invention. It should be understood that many specifics of the invention described above can be changed without departing from the concept of the invention. For example, word size, address field length, memory size, number of control bits 87 used and other implementation-specific items can vary in other embodiments. Also, while effects processor 50 was described as an audio effects processor that performs operations on audio signals in a sound processing system, a person of ordinary skill in the art will realize that effects processor 50 can also process radar signals, seismic signals or any other time series data in any signal processing system.

Many other equivalent or alternative methods of implementing memory initialization circuit will be apparent to those skilled in the art. For example, while sound processing engine 40, sound processor 50 and interface unit 60 were all described as being part of a single chip sound processor, the functionality of these elements can be performed from separate ICs in other embodiments. Similarly, it is possible to develop an architecture in which instruction execution unit 70 and sound memory engine 74 are implemented on separate chips. Also, sound processor 30 can be included directly on a computer motherboard rather than a dedicated multimedia card 32, and in another embodiment, constant values other than zero are read from and written through multiplexors 98 and 132. These equivalents and other alternatives are intended to be included within the scope of the present invention.

What is claimed is:

1. A memory initialization circuit comprising:

a plurality of dual-use memory buffers, each of said dual-use memory buffers storing data representing either a value representative of an audio delay length or an audio data signal;

a counter that sequentially updates a count value;

a plurality of memory use indicators corresponding to said plurality of dual-use memory buffers, each of said memory use indicators indicating whether its corresponding memory buffer stores a value representative of an audio delay length or an audio data signal; and compare logic, coupled to said plurality of dual-use memory buffers and to said counter, said compare logic configured to update a first and a second one of said plurality of memory use indicators based on a comparison of the data stored in corresponding first and second memory buffers and said count value.

2. The memory initialization circuit of claim 1 wherein each of said plurality of memory buffers is initially loaded with a data value representative of an audio delay length and the memory use indicators corresponding to each memory buffer are initially set to a CLR state.

3. The memory initialization circuit of claim 2 wherein as the count of said counter is increased the memory use indicators corresponding to individual memory buffers are reset to a RD state after the counter reaches a value equal to the data value stored in the individual memory buffer.

4. The memory initialization circuit of claim 3 further comprising a read output circuit that, for an audio data read operation for a selected one of said plurality of memory buffers, outputs either audio signal data stored in said selected memory buffer or a constant value depending on the state of the memory use indicator corresponding to said selected memory buffer.

5. The memory initialization circuit of claim 4 wherein said read output circuit outputs audio signal data when said memory use indicator corresponding to said selected memory buffer is set to RD and wherein said output circuit outputs a constant value when said memory use indicator corresponding to said selected memory buffer is set to CLR.

6. The memory initialization circuit of claim 5 wherein said constant value is zero.

7. A sound processor comprising the memory initialization 2 circuit of claim 1.

8. A memory initialization circuit comprising:

a counter that sequentially updates a count value;

a first memory buffer storing a first delay length value;

a second memory buffer storing a second delay length value;

a comparator, coupled to said counter and to said first and second memory buffers, for comparing the first delay length value to the count value of said counter and for comparing the second delay length value to the count value of said counter; and an output circuit coupled to an audio data memory, said output circuit being configured to output either a constant value or audio data from said audio data memory depending on the output of said comparator.

9. The apparatus of claim 7 wherein said output circuit outputs said constant value when said count value of said counter is less than said first delay length value and outputs audio data when said count value is equal to or greater than said first delay length value.

10. The apparatus of claim 7 wherein said first memory buffer stores said first delay length value during a first time period and then stores audio data during a second time period after the first time period.

11. The apparatus of claim 10 wherein said first memory buffer stores audio data after said count value equals said first delay length value.

12. The apparatus of claim 7 further comprising first and second memory clearing indicators, corresponding to said first and second memory buffers, and wherein:

each of said first and second memory clearing indicators, stores a value of either clear or not clear;

said first memory clearing indicator is set to clear during a first time period and is set to not clear when said count value equals said first delay length thus ending the first time period and starting a second time period; and said output circuit outputs said constant value during said first time period and outputs said audio data during said second time period.

13. The apparatus of claim 7 wherein said constant value equals zero.

14. The apparatus of claim 7 wherein said output circuit is coupled to said audio data memory through said first and second memory buffers.

15. A memory initialization circuit for a signal processor, said initialization circuit comprising:

a) a plurality of memory buffers;

b) a plurality of memory use indicators corresponding to said plurality of memory buffers, each of said memory use indicators including a memory clearing indicator that indicates whether data stored in its corresponding memory buffer is valid audio data and a mode operation indicator that indicates whether audio data is to be read from or written to its corresponding memory buffer;

c) a counter that sequentially updates a count value;

d) a comparator, coupled to said counter and to said plurality of memory buffers, said counter configured to compare data stored in a selected one of said plurality of memory buffers with said count value;

e) a read operation output circuit coupled to said plurality of memory buffers and to said plurality of memory use indicators, wherein, when for said selected memory buffer the corresponding mode operation indicator indicates audio data is to be read from said selected memory buffer, said read operation outputs data stored in said memory buffer when the corresponding memory clearing indicator for said selected memory buffer indicates the data stored therein is valid audio data and said read operation circuit outputs a constant value when the corresponding memory clearing indicator for said selected memory buffer indicates the data stored therein is not valid audio data; and f) a memory clearing indicator reset circuit coupled between said comparator and said plurality of memory use indicators, wherein, when said comparator indicates that data stored in said selected memory buffer is equal to said count value, said memory clearing indicator reset circuit resets the memory clearing indicator corresponding to said selected location to indicate that data stored in said selected memory buffer location is valid audio data.

16. The apparatus of claim 14 wherein said constant value equals zero.

17. The apparatus of claim 14 further comprising a write operation output circuit coupled to said plurality of memory buffers and to said plurality of memory use indicators, wherein, when for a selected memory buffer the corresponding mode operation indicator indicates audio data is to be written to said selected memory buffer, said write operation circuit outputs data stored in said selected memory buffer to an audio memory when the corresponding memory clearing indicator for said selected memory buffer indicates the data stored therein is valid audio data and said write operation circuit outputs a constant value to said audio memory when the corresponding memory clearing indicator for said selected memory buffer indicates the data stored therein is not valid audio data.

18. The apparatus of claim 14 further wherein each of said plurality of memory buffers store a value representative of a length of an audio delay until the count value of said counter is increased to equal said value.

19. A sound processor comprising the memory initialization circuit of claim 14.

20. A method of reading data from an audio delay memory, said method comprising:

storing values representative of audio delay line lengths in a plurality of memory buffer locations;

setting memory clearing indicator flags for each of said memory buffer locations to indicate whether data stored in each buffer location represents an audio delay line length or audio signal data;

for a read operation of an individual memory buffer location, checking its corresponding memory clearing indicator flag, and if the flag indicates the value stored in the buffer location represents an audio delay line length, returning a constant value in response to said read operation, if the flag indicates the value stored in the buffer location represents audio signal data, returning said audio signal data in response to said read operation.

21. The method of claim 20 wherein said constant value is zero.

22. The method of claim 20 further comprising:

sequentially updating a count value in a counter by counting upwards from zero at a sample rate upon initiation of a sound processor program; and during said read operation, if the memory indicator flag indicates the value stored in the buffer location represents an audio delay line length, comparing the count value to the audio delay line length and if they match updating the memory clearing indicator flag so that the flag indicates the buffer location stores valid audio signal data.

23. The method of claim 22 wherein said values representative of audio delay line lengths are written into said memory buffer locations upon initiation of the sound processor program.

24. The method of claim 23 wherein, upon initiation of the sound processor program, said memory clearing indicator flags are initially set to indicate an audio delay line length is stored in said memory buffer locations.

* * * * *